US012608303B2

(12) United States Patent
Liu et al.

(10) Patent No.: US 12,608,303 B2
(45) Date of Patent: Apr. 21, 2026

(54) AUTOMATED COMBOBOX.SELECT IN A NON-TECHNOLOGY WAY

(71) Applicant: MICRO FOCUS LLC, Wilmington, DE (US)

(72) Inventors: Jian Liu, Shanghai (CN); Shuhui Fu, Shanghai (CN); Yi-Bin Guo, Shanghai (CN); Yun Yuan, Shanghai (CN); Runze Dong, Shainghai (CN)

(73) Assignee: Micro Focus LLC, Austin, TX (US)

( * ) Notice: Subject to any disclaimer, the term of this patent is extended or adjusted under 35 U.S.C. 154(b) by 104 days.

(21) Appl. No.: 18/521,885

(22) Filed: Nov. 28, 2023

(65) Prior Publication Data

US 2025/0173252 A1 May 29, 2025

(51) Int. Cl.
| | |
|---|---|
| *G06F 11/3698* | (2025.01) |
| *G06F 11/3668* | (2025.01) |
| *G06V 20/50* | (2022.01) |
| *G06V 30/18* | (2022.01) |
| *G06V 30/19* | (2022.01) |

(52) U.S. Cl.
CPC ...... G06F 11/3698 (2025.01); G06F 11/3688 (2013.01); G06V 20/50 (2022.01); G06V 30/18086 (2022.01); G06V 30/19093 (2022.01)

(58) Field of Classification Search
None
See application file for complete search history.

(56) References Cited

U.S. PATENT DOCUMENTS

| | | | | |
|---|---|---|---|---|
| 7,913,231 | B2 * | 3/2011 | Stienhans | G06F 11/3672 |
| | | | | 717/109 |
| 9,740,927 | B2 * | 8/2017 | Deryagin | G06V 30/413 |
| 10,275,266 | B1 * | 4/2019 | Bhavineni | G06F 40/58 |
| 2003/0011641 | A1 * | 1/2003 | Totman | G06F 3/0482 |
| | | | | 715/810 |
| 2017/0053420 | A1 * | 2/2017 | vanderZweep | G06F 18/21 |
| 2018/0267885 | A1 * | 9/2018 | Budurean | G06F 11/3688 |
| 2020/0174911 | A1 * | 6/2020 | Ben Shabtai | G06F 9/451 |

(Continued)

FOREIGN PATENT DOCUMENTS

CN          115063801 A          9/2022

OTHER PUBLICATIONS

Borjesson, "Automated System Testing using Visual GUI Testing Tools: A Comparative Study in Industry", 2012, IEEE (Year: 2012).*

*Primary Examiner* — Hossain M Morshed
(74) *Attorney, Agent, or Firm* — Sheridan Ross P.C.

(57) ABSTRACT

A method includes capturing a first image of the GUI at a first time, after the first time, providing the GUI with an input event to change a configuration of at least one of the plurality of graphical elements to include an expanded region and capturing a second image of the GUI at a second time after the input event. A background of the second image of the GUI changes from a background of the first image of the GUI to include one or more background text blocks and an expanded region text block. The method also includes obtaining, a difference image, determining whether the difference image includes the one or more background text blocks and the expanded region text block; and selecting a text block closest to a position of the at least one of the plurality of graphical elements as the expanded region text block.

20 Claims, 13 Drawing Sheets

(56)          References Cited

U.S. PATENT DOCUMENTS

| | | | | |
|---|---|---|---|---|
| 2022/0138088 | A1* | 5/2022 | Shang | .................. G06F 11/3684 |
| | | | | 717/124 |
| 2022/0391313 | A1* | 12/2022 | Shang | .................. G06F 11/3698 |
| 2025/0173252 | A1* | 5/2025 | Liu | .................. G06V 30/19093 |

* cited by examiner

Storage Medium
600

Program Execution Instructions
602

User Input Event Provision Instructions
604

Image Capture Instructions
606

Difference Image Determination Instructions
608

Expandable Graphical Component Detection Instructions
610

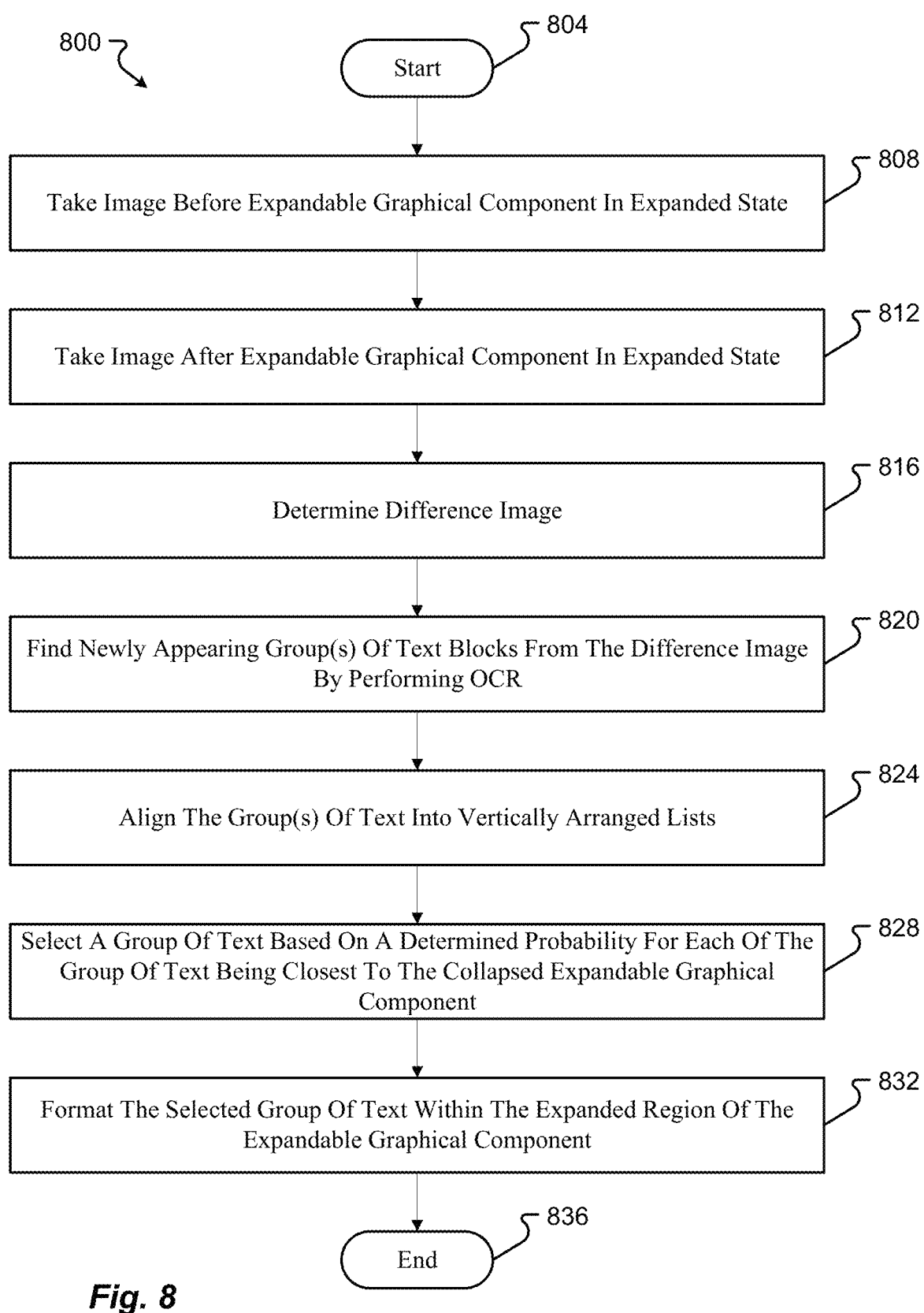

800

804
Start

808
Take Image Before Expandable Graphical Component In Expanded State

812
Take Image After Expandable Graphical Component In Expanded State

816
Determine Difference Image

820
Find Newly Appearing Group(s) Of Text Blocks From The Difference Image By Performing OCR 824
Align The Group(s) Of Text Into Vertically Arranged Lists 828
Select A Group Of Text Based On A Determined Probability For Each Of The Group Of Text Being Closest To The Collapsed Expandable Graphical Component 832
Format The Selected Group Of Text Within The Expanded Region Of The Expandable Graphical Component 836
End

904
Start

908
Open Expanded Region Of Expandable Graphical Component

912
Detect List Box Of The Expandable Region

916
Find Selected Item In List Box

920
Determine That The Selected Item Exists In The List Box

924
Determine That List Box Is Able To Scroll To The End

928
Verify Expandable Graphical Component Is At The Same Position To Prevent Scroll To Caused Page Movement 932
End

1000

AUTOMATED COMBOBOX.SELECT IN A NON-TECHNOLOGY WAY

FIELD

The present disclosure relates generally to automatically testing the layout of components of an application and particularly to systems and methods for automatically testing the layout of expandable components of an application in a non-technology manner.

BACKGROUND

Application testing is performed to verify that an application is functioning according to target specifications or without errors. An application can refer to software, firmware, or other types of machine-readable instructions. Bugs in applications can cause issues that lead to abnormal behavior of the application. Unified functional testing (UFT) includes functional testing, regression testing as well as service testing. UFT enables testers to automate the actions of a user on the web or a client-based computer program, test those actions, and find potential faults that may arise. In an automated debugging process, a test script can be generated, and a user simulated program can execute the test script to simulate user actions that previously led to the discovery of an issue to recreate the issue.

UFT, for example, uses technology (e.g., the insertion of code) to test the actions or behavior of graphical components. With technology, code for different programming languages such as C #, web (html) or Java, for example, is injected into the application. When UFT wants to perform a click operation on a test object, code is inserted into the application and a call is made to the click operation by the inserted code. Due to system and functional variations, the behavior of certain graphical components (e.g., graphical components including expandable graphical components such as an expanded region) can be difficult to detect.

If an expandable graphical component (e.g., a combo box, a list box, a drop-down list box, a multiple-selection list box, a drop-down menu, a drop-down, a picklist, a pull-down list, etc.) is sensitive to the selection of an item provided within the expanded region, the technology employed (e.g., the inserted code) can select or call the test object, but the application may not know that the selection or call has occurred since this action is not a real action executed by the application. Therefore, the application may not know that the selection or the call has been executed which causes the application to develop an error which might be undetected at that time.

Moreover, if the technology fails to test the actions or behavior of the expandable graphical component, but scrolling through the expanded region is not required, UFT along with optical character recognition (OCR) and device replay can automate this process such as in combobox.select, for example. However, if the technology fails to test the actions or behavior of the expandable graphical component and scrolling through the expanded region is required, it is difficult to use the current UFT and the device replay to find an item in the expanded region. If testing omits testing of the expanded region of the expandable graphical component of the AUT, the AUT may have faults that are allowed to propagate to users outside of the testing environment which can be expensive and resource intensive to discover and remedy as well as inflict damage to other systems.

SUMMARY

Embodiments of the present disclosure provide systems, methods and non-transitory computer-readable mediums for automatically testing of an application, the method includes executing, by a processor of a testing system, one or more test scripts on an Application Under Test (AUT), the AUT including a graphical user interface (GUI) including a plurality of graphical elements and the one or more test scripts causing the processor to perform one or more functional tests on the AUT through the plurality of graphical elements of the GUI. The method also includes capturing, by an imaging device of the testing system, a first image of the GUI at a first time, after the first time, providing the GUI with an input event to change a configuration of at least one of the plurality of graphical elements and capturing, by the imaging device of the testing system, a second image of the GUI at a second time after the input event. The method further includes obtaining, by the processor of the testing system, a difference image including a difference between the first image and the second image, determining, by the processor of the testing system, whether the difference image includes one or more text regions and selecting, by the processor of the testing system, a text region of the one or more text regions closest to a position of the at least one of the plurality of graphical elements.

Aspects of the above method include wherein the plurality of graphical elements includes a text input box, a list box and a toggle button.

Aspects of the above method further include determining, by the processor of the testing system, a confidence score indicating a degree of confidence as to whether the text region is associated with the at least one of the plurality of graphical elements.

Aspects of the above method further include upon determining whether the difference image includes one or more text regions, causing a test script of the one or more test scripts of the AUT in accordance with the GUI comprising the one of the plurality of graphical elements.

Aspects of the above method further include aligning the one or more text regions into vertically arranged lists.

Aspects of the above method further include filtering the one or more text regions.

Aspects of the above method further include extending the selected text region in the up, down, left, and right directions.

According to one embodiment of the present disclosure, a system including a processor and a memory coupled with and readable by the processor and storing therein a set of instructions which, when executed by the processor, causes the processor to execute one or more test scripts on an Application Under Test (AUT), the AUT including a graphical user interface (GUI) including a plurality of graphical elements and the one or more test scripts causing the processor to perform one or more functional tests on the AUT through the plurality of graphical elements of the GUI, capture a first image of the GUI at a first time, after the first time, provide the GUI with an input event to change a configuration of at least one of the plurality of graphical elements, capture a second image of the GUI at a second time after the input event, obtain a difference image including a difference between the first image and the second image, determine whether the difference image includes one or more text regions and select a text region of the one or more text regions closest to a position of the at least one of the plurality of graphical elements.

Aspects of the above system include wherein the plurality of graphical elements includes a text input box, a list box and a toggle button.

Aspects of the above system include wherein the instructions, when executed by the processor, further cause the processor to determine a confidence score indicating a degree of confidence as to whether the text region is associated with the at least one of the plurality of graphical elements.

Aspects of the above system include wherein the instructions, when executed by the processor, further cause the processor upon determining whether the difference image includes one or more text regions, to cause a test script of the one or more test scripts of the AUT in accordance with the GUI comprising the one of the plurality of graphical elements.

Aspects of the above system include wherein the instructions, when executed by the processor, further cause the processor to align the one or more text regions into vertically arranged lists.

Aspects of the above system include wherein the instructions, when executed by the processor, further cause the processor to filter the one or more text regions.

Aspects of the above system include when executed by the processor, further cause the processor to extend the selected text region in the up, down, left, and right directions.

According to one embodiment of the present disclosure, a non-transitory, computer-readable medium includes a set of instructions stored therein which when executed by a processor, causes the processor to execute one or more test scripts on an Application Under Test (AUT), the AUT including a graphical user interface (GUI) including a plurality of graphical elements and the one or more test scripts causing the processor to perform one or more functional tests on the AUT through the plurality of graphical elements of the GUI, capture a first image of the GUI at a first time, after the first time, provide the GUI with an input event to change a configuration of at least one of the plurality of graphical elements, capture a second image of the GUI at a second time after the input event, obtain a difference image including a difference between the first image and the second image, determine whether the difference image includes one or more text regions and select a text region of the one or more text regions closest to a position of the at least one of the plurality of graphical elements.

Aspects of the above non-transitory computer-readable medium include wherein the plurality of graphical elements includes a text input box, a list box and a toggle button.

Aspects of the above non-transitory computer-readable medium include wherein the instructions, when executed by the processor, further cause the processor to determine a confidence score indicating a degree of confidence as to whether the text region is associated with the at least one of the plurality of graphical elements.

Aspects of the above non-transitory computer-readable medium include wherein the instructions, when executed by the processor, further cause the processor upon determining whether the difference image includes one or more text regions, to cause a test script of the one or more test scripts of the AUT in accordance with the GUI comprising the one of the plurality of graphical elements.

Aspects of the above non-transitory computer-readable medium include wherein the instructions, when executed by the processor, further cause the processor to align the one or more text regions into vertically arranged lists.

Aspects of the above non-transitory computer-readable medium include wherein the instructions, when executed by the processor, further cause the processor to filter the one or more text regions.

These and other needs are addressed by the various embodiments and configurations of the present disclosure.

The present disclosure can provide a number of advantages depending on the particular configuration. These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. For example, the computer readable medium(s) may be non-transitory or non-volatile medium, such as a magnetic disk or solid-state non-volatile memory or volatile medium such as RAM.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Application testing involves detecting issues in an application that cause the application to behave abnormally. An application includes machine-readable instructions, such as those of software and/or firmware. Based on the testing, the application can be debugged to eliminate the issues. In some cases, application testing can be performed manually, with a user interacting with the application while the application executes. For example, the user can make user input selections in a graphical user interface (GUI) of the application during execution of the application. Once issues are detected based on interactions between the user and the application, quality assurance personnel may attempt to recreate the issues during a debugging process. In a manual debugging process, the quality assurance personnel identifies user actions with respect to the GUI that led to the discovery of an issue, and repeats the user actions to recreate the issue. In an automated debugging process, a test script can be generated (e.g., manually by the quality assurance personnel), and a user simulation program can execute the test script to simulate the user actions that previously led to discovery of an issue in an attempt to recreate the issue.

In accordance with some implementations of the present disclosure, techniques or mechanisms are used to identify expandable graphical components of the GUI of an application. An "expandable graphical component" refers to any graphical component of a GUI that expands and collapses based on user interactions such as by making a selection, making a text input, manipulating an object, and so forth. An expandable graphical component may include but is not limited to a combo box, a list box, a drop-down list box, a multiple-selection list box, a drop-down menu, a drop-down, a picklist, a pull-down list, etc. A difference image is generated based on an image of the GUI with the expandable graphical component in the collapsed state and an image of the GUI with the expandable graphical component in the expanded state. The difference image is then filtered to detect the expanded region of the expandable graphical component from other group(s) of text provided on the difference image. A probability is assigned to each of the expandable portion and the other group(s) of text based on the position of the expandable graphical component in the collapsed state. A user can use this algorithm for generating a test script for testing the application by simulating user actions for detecting the expandable graphical components.

The terms "determine", "calculate" and "compute" and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

FIG. 8 is a flowchart illustrating an example method for automatically testing of an application according to embodiments of the present disclosure.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuring description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein. Embodiments of the present disclosure are directed to systems and methods for automatically testing the application elements such as combo boxes in a non-technology manner.

Figure 10:
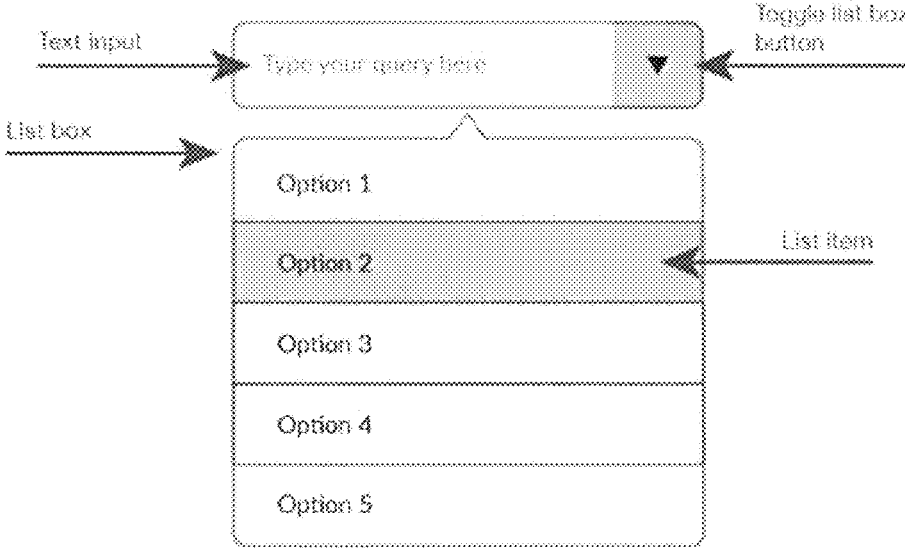
FIG. 10 illustrates an example of an expandable graphic component.

FIG. 10 illustrates an example of an expandable graphic component 1000. The expandable graphical component 1000 is used to present a list of items from which a user can select. The expandable graphical component 1000 may include but is not limited to a combo box, a list box, a drop-down list box, a multiple-selection list box, a drop-down menu, a drop-down, a picklist, a pull-down list, etc. The expandable graphical component 1000 generally includes an input box such as a text input box which can be editable or not, a toggle list box button which activates the expanded region of the expandable graphical component, and the expanded region which includes a list box and list items.

Figure 1:
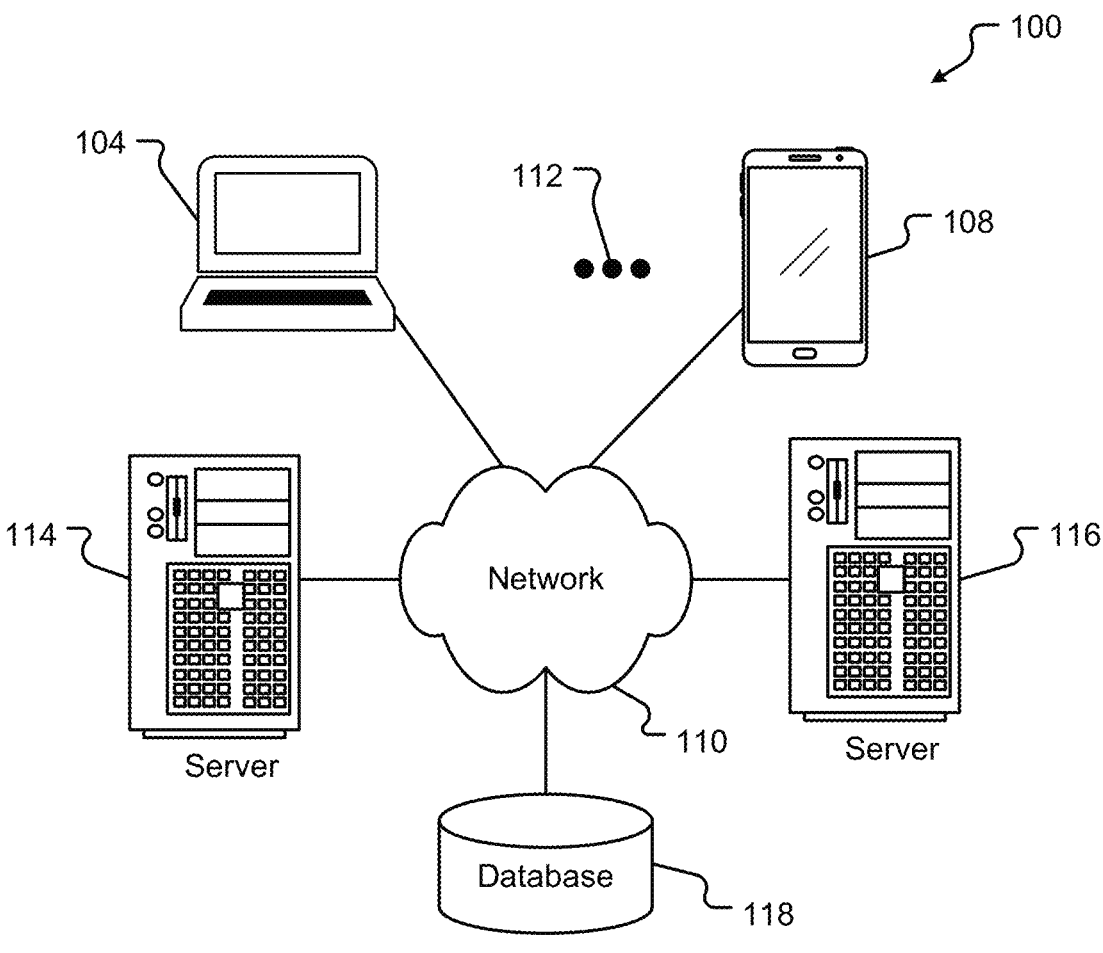
FIG. 1 is a block diagram illustrating elements of an example computing environment in which embodiments of the present disclosure may be implemented.

FIG. 1 is a block diagram illustrating elements of an example computing environment 100 in which embodiments of the present disclosure may be implemented. More specifically, this example illustrates a computing environment 100 that may function as the servers, user computers, or other systems provided and described herein. The environment 100 includes one or more user computers, or computing devices, such as a computer 104, a communication device 108, and/or more devices 112. The devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These devices 104, 108, 112 may also have any of a variety of applications, including for example, database client and/or server applications, and web browser applications. Alternatively, the devices 104, 108, 112 may be any other electronic device, such as a thin-client computer, Internet-enabled mobile telephone, and/or personal digital assistant, capable of communicating via a network 110 and/or playing audio, displaying images, etc. Although the example computer environment 100 is shown with two devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The environment 100 may also include one or more servers 114, 116. For example, the servers 114 and 116 may comprise build servers, which may be used to test webpage layout on various screen sizes via the device 104, 108, 112. The servers 114 and 116 can be running an operating system including any of those discussed above, as well as any commercially available server operating systems. The servers 114 and 116 may also include one or more file and/or application servers, which can, in addition to an operating system, include one or more applications accessible by a client running on one or more of the devices 104, 108, 112. The server(s) 114 and/or 116 may be one or more general purpose computers capable of executing programs or scripts in response to the computers 104, 108, 112. As one example, the servers 114 and 116, may execute one or more automated tests. The automated tests may be implemented as one or more scripts or programs written in any programming language, such as Java™, C, C #®, or C++, and/or any scripting language, such as Perl, Python, or Tool Command Language (TCL), as well as combinations of any programming/scripting languages. The server(s) 114 and 116 may also include database servers, including without limitation those commercially available from Oracle®, Microsoft®, Sybase®, IBM® and the like, which can process requests from database clients running on the device 104, 108, 112.

The tests created and/or initiated by the device 104, 108, 112 (including tests created by other devices not illustrated) are shared to the server 114 and/or 116, which then may test and/or deploy the websites/webpages. The server 114 and/or 116 may transfer the generated webpage layout and/or data related to the same to the device 104, 108, 112. Although for ease of description, FIG. 1 illustrates two servers 114 and 116, those skilled in the art will recognize that the functions described with respect to servers 114, 116 may be performed by a single server and/or a plurality of specialized servers, depending on implementation-specific needs and parameters. The computer systems 104, 108, 112, and servers 114 116 may function as the system, devices, or components described herein.

The environment 100 may also include a database 118. The database 118 may reside in a variety of locations. By way of example, database 118 may reside on a storage medium local to (and/or resident in) one or more of the computers/servers 104, 108, 112, 114, 116. Alternatively, it may be remote from any or all of the computers/servers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers/servers 104, 108, 112, 114, 116 may be stored locally on the respective computer/server and/or remotely, as appropriate. The database 118 may be used to store webpage layout data (e.g., respective locations of a plurality of elements), alerts, etc.

Figure 2:
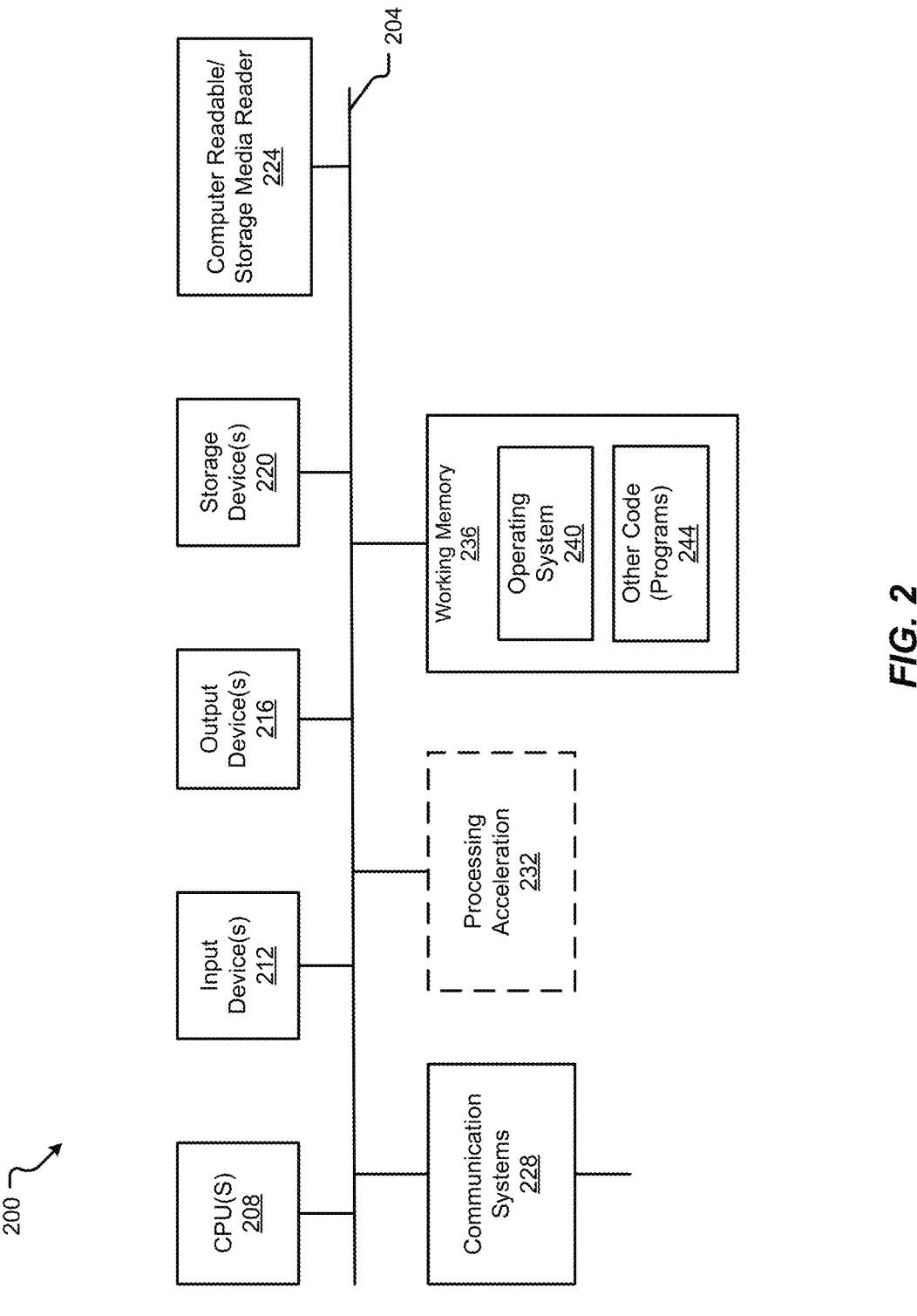
FIG. 2 is a block diagram illustrating elements of an example computing system in which embodiments of the present disclosure may be implemented.

FIG. 2 is a block diagram illustrating elements of an example computing system 200 in which embodiments of the present disclosure may be implemented. More specifically, this example illustrates one embodiment of a computer system 200 upon which the servers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computers such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
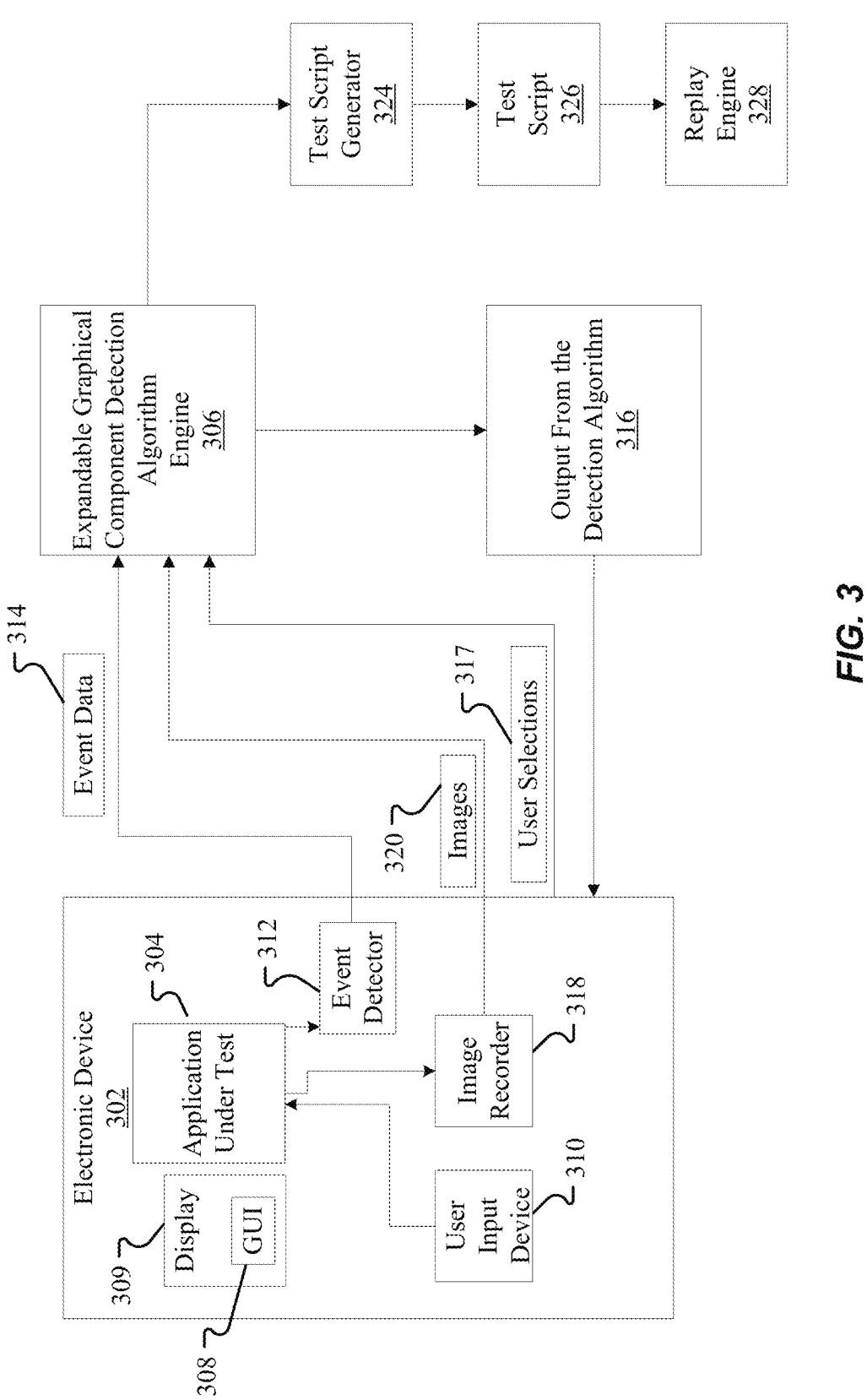
FIG. 3 is a block diagram of an example arrangement that includes an electronic device in which an application under test is executed according to an embodiment of the present disclosure.

FIG. 3 is a block diagram of an example arrangement that includes an electronic device in which an application under test is executed according to an embodiment of the present disclosure. FIG. 3 includes the electronic device 302 in which an application under test 304 is executed. Examples of the application under test 304 can include any of the following: a web browser, a game application, a three-dimensional (3D) simulation application, and so forth. Electronic device 302 can be the same or different than devices 104, 108, 112 illustrated in FIG. 1.

The arrangement includes an expandable graphical component detection algorithm engine 306 for detecting the location of the expanded region of an expandable graphical component presented by the application under test 304 during execution of the application under test 304. The GUI 308 is displayed by a display device 309 that is part of or coupled to the electronic device 302.

As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The electronic device 302 includes a user input device 310, which can be used by a user at the electronic device 302 to make selections of expandable graphical components in the GUI 308 presented by the application under test 304. Examples of the user input device 310 can include any or some combination of the following: a mouse device, a keyboard, a touchscreen, a touchpad, and so forth.

The electronic device 302 includes an event detector 312 to detect an event corresponding to a user action made with respect to the GUI 308, such as with the user input device 110. The event detector 312 can be implemented using machine-readable instructions executable in the electronic device 302, or as a hardware processing circuit. The event detector 312 outputs event data 314 to the expandable graphical component detection algorithm engine 306. The event data 314 includes information representing events corresponding to user actions made with respect to the GUI 308 and detected by the event detector 312.

The electronic device 302 further includes an image recorder 318, which can record images of the GUI 308 as a user interacts with the GUI 308. The image recorder 318 can be implemented using machine-readable instructions executable in the electronic device 302, or as a hardware processing circuit.

The images captured by the image recorder 318 can be part of video frames captured by the image recorder 318. Video frames can refer to a continual sequence of image frames. Alternatively, the images captured by the image recorder 318 can include still images of the GUI 308 as a user interacts with the GUI 308. The image recorder 318 outputs images 320 of different states of the GUI 308 as the user interacts with the GUI 308 to the expandable graphical component detection algorithm engine 306.

The expandable graphical component detection algorithm engine 306 can be executed in a system that is separate from the electronic device 302. In such examples, the event data 314 and images 320 can be transmitted by the electronic device 302 over a network to the expandable graphical component detection algorithm engine 306. In other examples, the expandable graphical component detection algorithm engine 306 can be part of the electronic device 302.

The expandable graphical component detection algorithm engine 306 is able to detect an expanded region of the expandable graphical component on the GUI 308 based on the event data 314 and the images 320. The expanded region identified or detected by the expandable graphical component detection algorithm engine 306 corresponds to a region in which a user-selected group of text can be provided within the expanded region of the expandable graphical component. As used here, selection of a group of text can refer to any type of interaction between the user and the expandable graphical components. Examples of expandable graphical components include any or some combination of the following: text boxes or text fields, menus, combo boxes, list boxes, drop-down list boxes, multiple-selection list boxes, drop-down menus, drop-downs, picklists, pull-down lists, and so forth.

The expandable graphical component detection algorithm engine 306 can generate a difference image based on an image of the GUI with the expandable graphical component in the collapsed state and an image of the GUI with the expandable graphical component in the expanded state. The difference image is then filtered to detect the expanded region of the expandable graphical component from other group(s) of text provided on the difference image. A probability is assigned to each of the expandable portion and the other group(s) of text based on the position of the expandable graphical component in the collapsed state. Once the expandable graphical component detection algorithm engine 306 has identified an expanded region of a particular expandable graphical component based on the event data 314 and the images 320 received from the event detector 312 and the image recorder 318, respectively, the user may be prompted (by the expandable graphical component detection algorithm engine 306 sending an indication to the electronic device 302) to make a further user input to cause further event data 314 and further images 320 to be sent to the expandable graphical component detection algorithm engine 306 for identifying a further expanded region of another expandable graphical component.

Once the expandable graphical component detection algorithm engine 306 has determined the difference image and the probabilities for the group(s) of text as discussed above, the expandable graphical component detection algorithm engine 306 then sends this information to the electronic device 302 via the output from the detection algorithm 316, to cause display of the information (e.g., the difference image and the probabilities of the group(s) of text) in the display device 309.

A user can interact with the output from the detection algorithm 316, where the interaction can cause modification of the output from the detection algorithm 316 or selection of a part of the output from the detection algorithm 316. User selections 317 relating to the output from the detection algorithm 316 can be sent by the electronic device 302 to the expandable graphical component detection algorithm engine 306.

Based on the user selections 317 from the output from the detection algorithm 316, (where the user selections 317 can include a selection of a group of text which can be identified as the group of text that belongs in the expanded region of the expandable graphical component based on the assigned probability of the selected group of text), an indication of the selected group of text can be provided by the expandable graphical component detection algorithm engine 306 to a test script generator 324.

The test script generator 324 produces, based on the selected group of text specified by the indication, a test script 326 for testing the application under test 304. The test script generator 324 can include a hardware processing circuit or a combination of a hardware processing circuit and machine-readable instructions.

The test script 326 includes program or application code. The test script 326 includes expandable graphical component test objects that represent respective expandable graphical components of the GUI 308. The expandable graphical component objects included in the test script 326 include the selected group of text based on interaction by a user with the output from the detection algorithm 316, as indicated by the indication.

The test script 326 further includes representations of a sequence of user actions that are to be performed on expandable graphical components represented by the expandable graphical component test objects in the test script 326. The representations of user actions can be added to the test script 326 based on user-provided information regarding what user actions are to be simulated with respect to the expandable graphical components represented in the test script 326. For example, a user may generate a file that describes what user actions are to be applied to the expandable graphical components.

The test script 326 is provided to a replay engine 328, which can include a simulation program that executes the test script 326. In some examples, the test script 326 can include a compiled code that can be executed by the replay engine 328. In other examples, the test script 326 can include interpreted code that can be interpreted and executed by the replay engine 328. Executing the test script 326 by the replay engine 328 recreates (simulates) user actions described in the test script 326, which are applied to the application under test 304 in an effort to debug issues associated with the application under test 304. The user actions include selections of expandable graphical components represented by test objects in the test script 326, where such expandable graphical components include a selected group of text that belong in the expanded region of the expandable graphical component as indicated.

Although FIG. 3 shows the expandable graphical component detection algorithm engine 306, the test script generator 324, and the replay engine 328 as being outside of the electronic device 302, it is noted that in further examples, any or some combination of the expandable graphical component detection algorithm engine 306, the test script generator 326, and the replay engine 328 can be part of the electronic device 302.

Figure 4A:
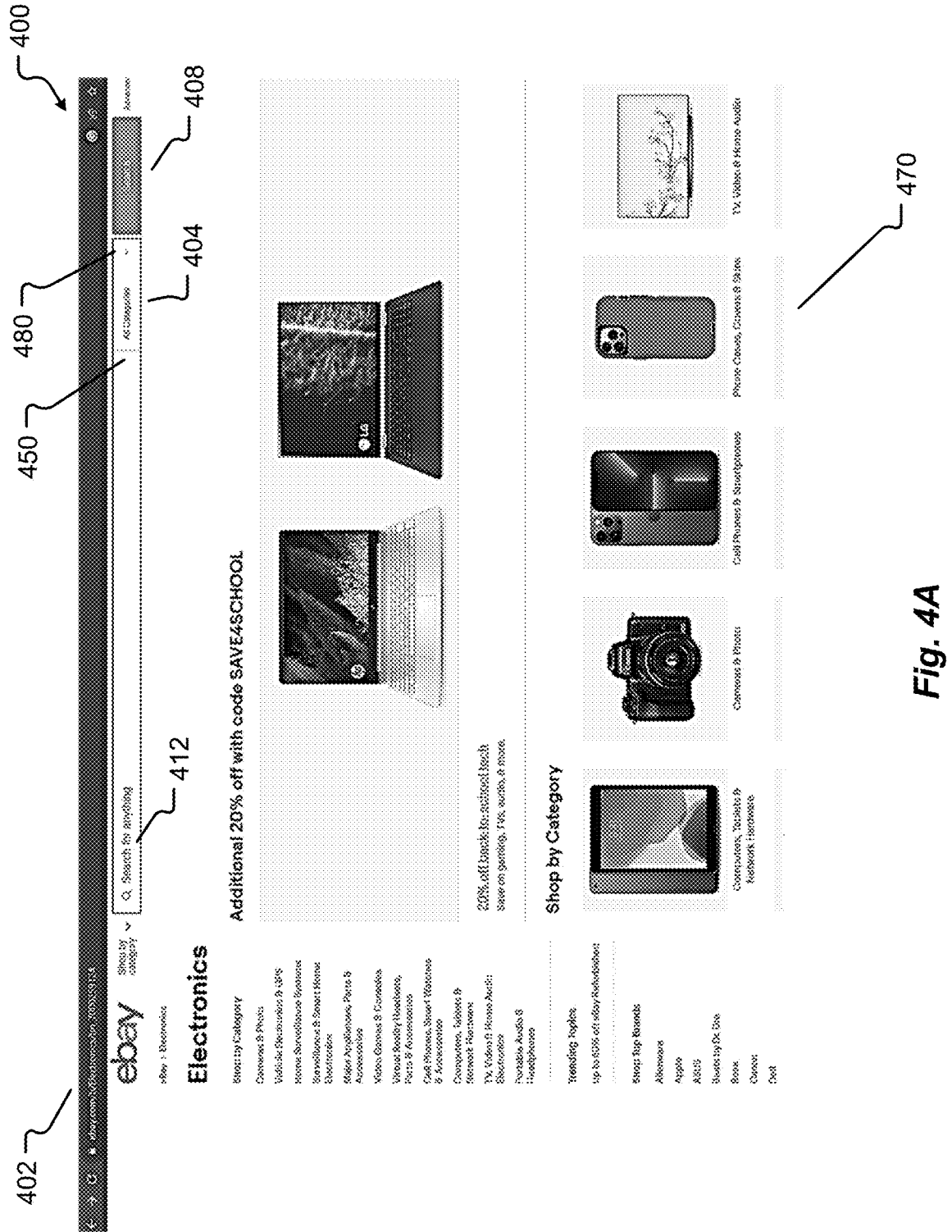
FIG. 4A is an example browser and web page according to embodiments of the present disclosure.
Figure 4B:
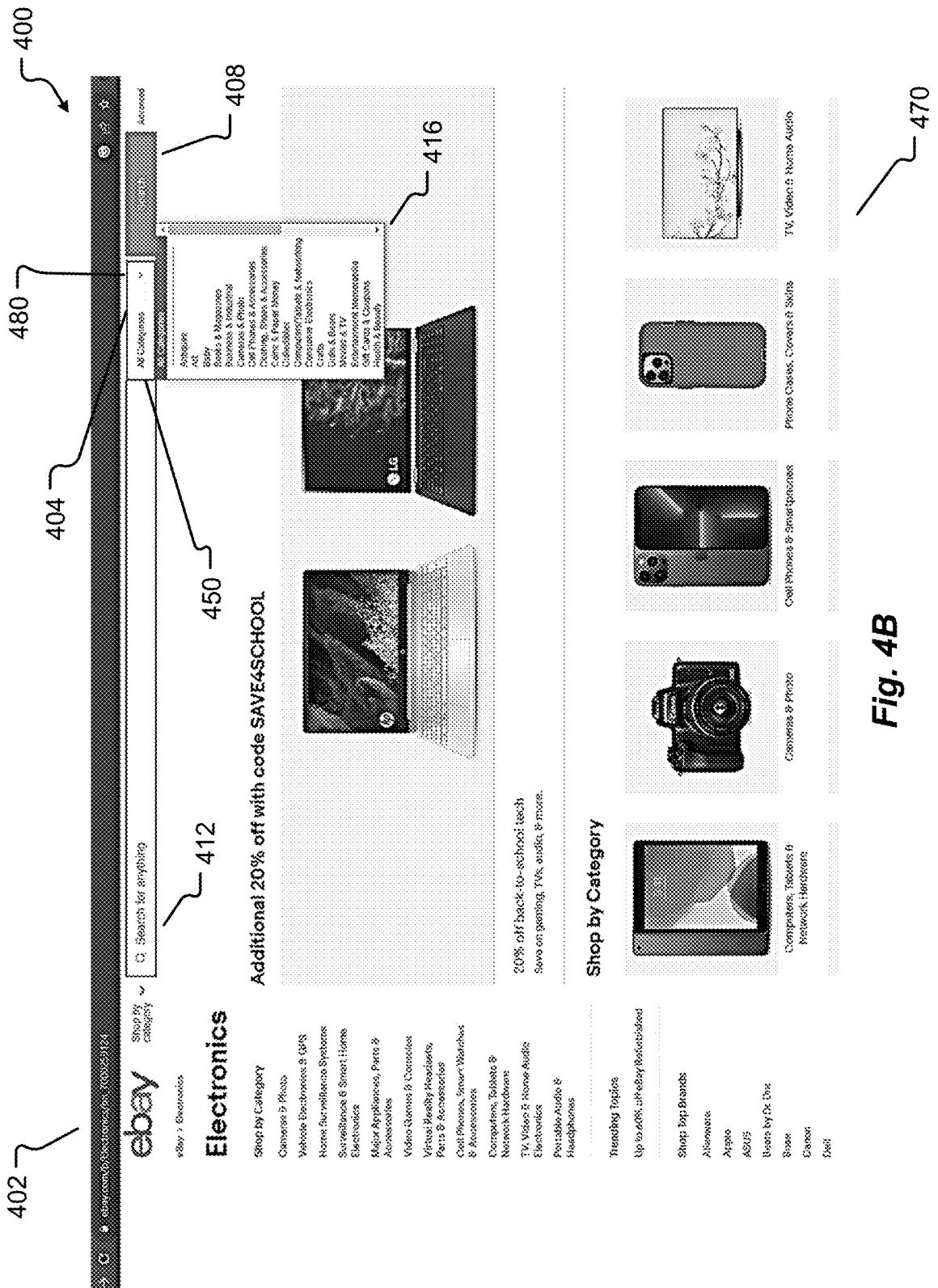
FIG. 4B is an example browser and web page according to embodiments of the present disclosure.

FIG. 4A illustrates an example browser 400 and web page 402. The web page 402 includes objects 408, 412 and 450. The web page 402 also includes background 470 which includes advertisement banners, background regions with graphics, text, groups of text, etc. According to an embodiment of the present disclosure, object 450 may be an expandable graphical component. The expandable graphical component 450 is in a collapsed state. In the collapsed state, the expandable graphical component 450 is only provided with an input box 404 and a toggle list box button 480. FIG. 4B also illustrates the example browser 400 and web page 402 including objects 408, 412 and 450 and background 470. Expandable graphical component 450, however, is in the expanded state. In the expanded state, the expandable graphical component 450 further includes an expanded region 416. The expanded region 416 includes a list box and list items in the form of a group of text as discussed in greater detail below.

If the web page 402 is the application under test and the expandable graphical component 450 is the object under test, then locating the expanded region 416 illustrated in FIG. 4B is easy when all other parts of the GUI (e.g., the background 470) do not change except for the expanded region 416. Locating the expanded region 416 from the two images (the image in a screenshot before the expanded region 416 is open, and the image in a screen shot after the expanded region 416 is open) is easy to determine when all other part of the UI do not change except for the expanded region 416. By subtracting the images, a difference image would indicate the expanded region 416. A computer vision program would be able to locate a rectangular region defined by the expanded region 416 of the expandable graphical region 450.

Figure 5A:
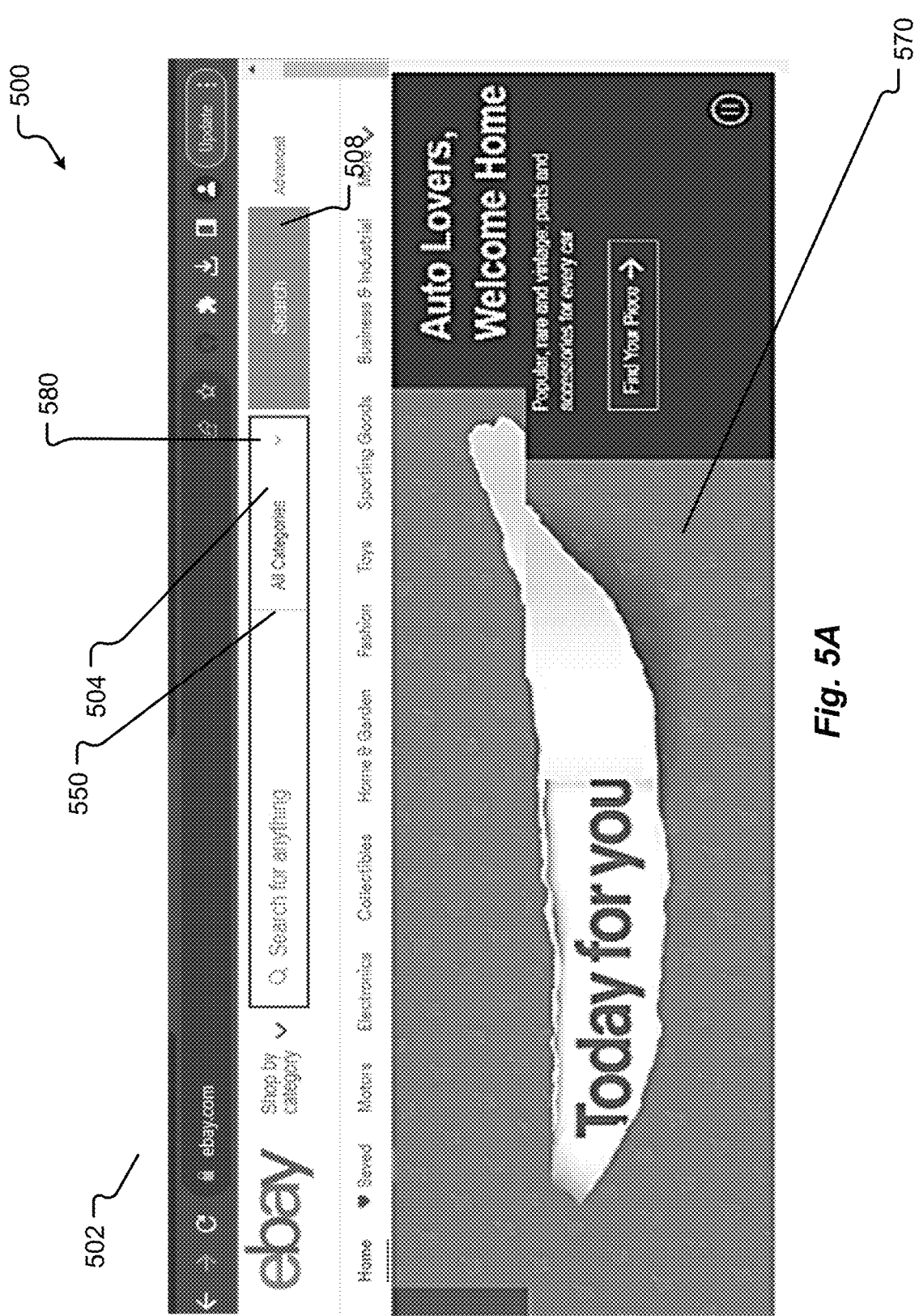
FIG. 5A is an example browser and web page according to embodiments of the present disclosure.
Figure 5B:
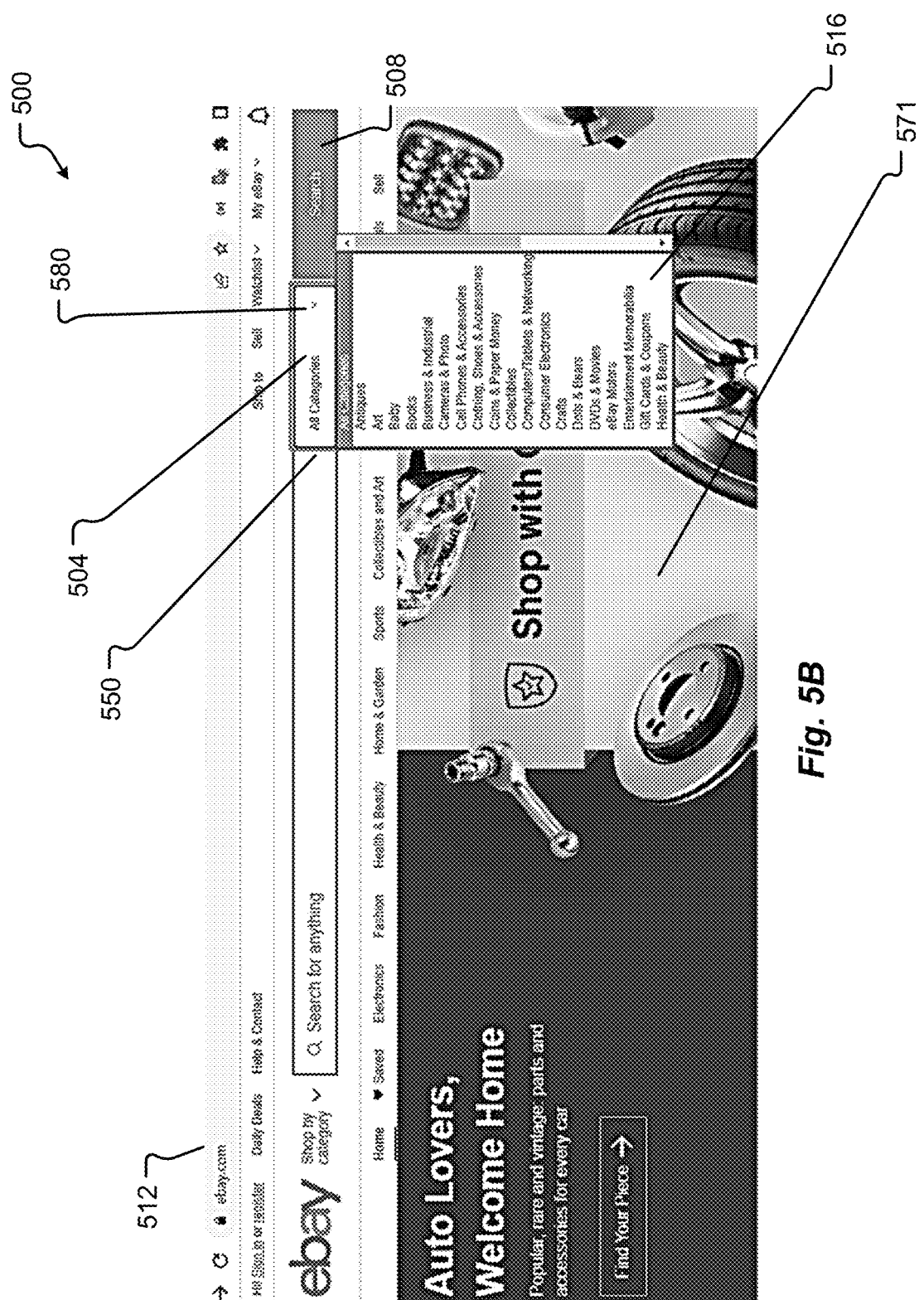
FIG. 5B is an example browser and web page according to embodiments of the present disclosure.
Figure 5C:
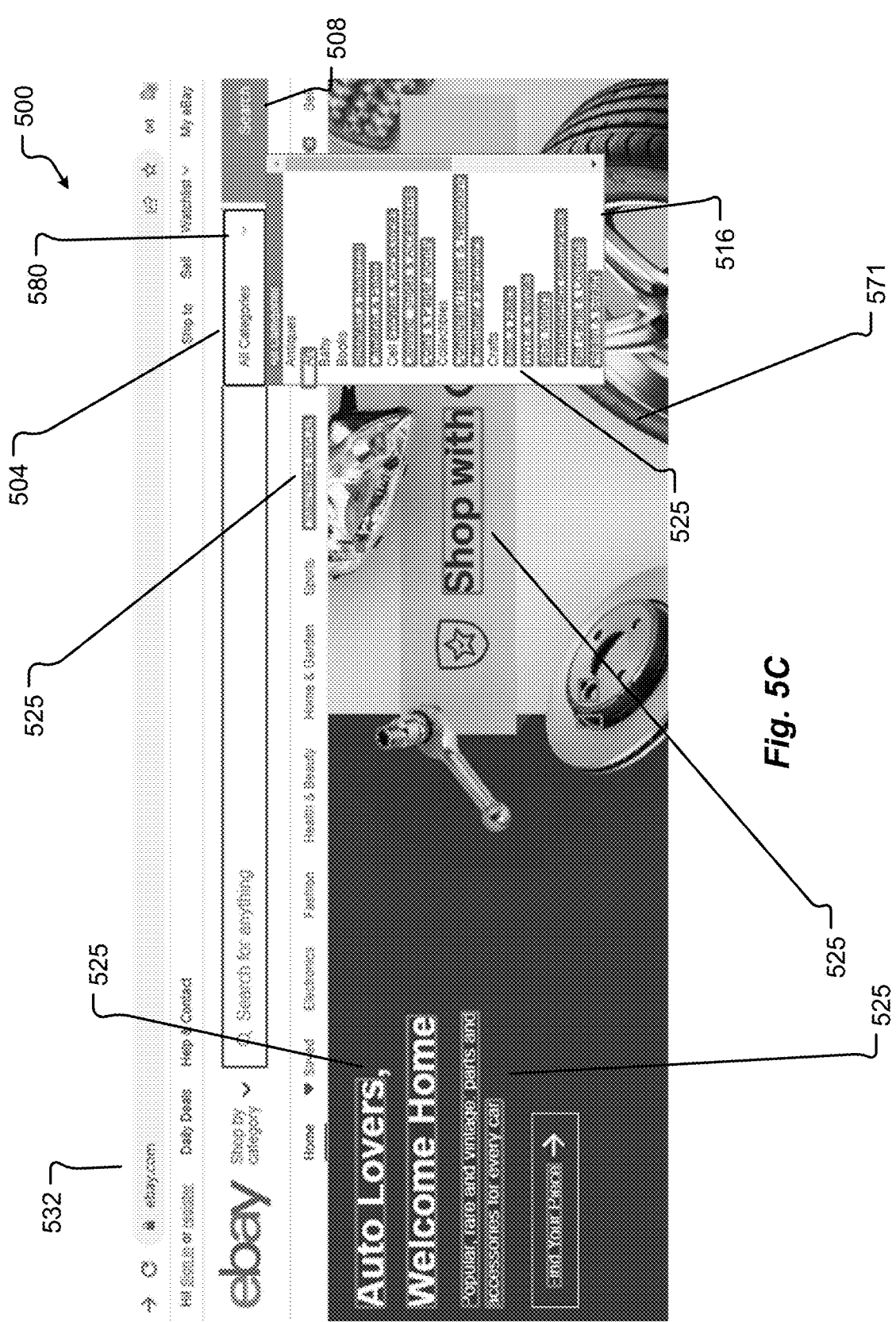
FIG. 5C is an example browser and web page according to embodiments of the present disclosure.

When the background of a web page changes due to advertisement banner changes and background region changes with changes to graphics as well as text, it is not easy to identify the expanded region of an expandable graphical component. FIGS. 5A-5C are examples of web pages 502-532 where a large area of the background changes from the expandable graphical component being in the collapsed state to the expanded state according to embodiments of the present disclosure.

FIG. 5A illustrates an example browser 500 and web page 502. The web page 502 includes objects 508 and 550. The web page 502 also includes background 570 which includes advertisement banners, background regions with graphics, text, groups of text, etc. According to an embodiment of the present disclosure, object 550 may be an expandable graphical component. The expandable graphical component 550 is in a collapsed state. In the collapsed state, the expandable graphical component 550 is only provided with an input box 504 and a toggle list box button 580. FIG. 5B also illustrates the example browser 500 and web page 512 including objects 508 and 550 and background 571. Expandable graphical component 550, however, is in the expanded state. In the expanded state, the expandable graphical component 550 further includes an expanded region 516. The expanded region 516 includes a list box and list items in the form of a group of text as discussed in greater detail below.

According to embodiments of the present disclosure, optical character recognition (OCR) technology and/or image detecting using image recorder 318 is used to detect all text and group(s) of text on the web page. According to embodiments of the present disclosure as illustrated in FIGS. 5A and 5B, a snapshot of the web page 502 is taken when the expandable graphical component 550 is in the collapsed state (FIG. 5A) and a snapshot of the web page 512 is taken when the expandable graphical component 550 is in the expanded state (FIG. 5B). As illustrated, the background 571 illustrated in FIG. 5B when the expandable graphical component 550 is in the expanded state has significantly changed than when the expandable graphical component 550 is in the collapsed state as illustrated in FIG. 5A.

A difference image may be generated from the two snapshots. The difference image illustrates the differences between the two snapshots and contains, among other things, the expanded region 516. According to embodiments of the present disclosure, the difference image may be generated into a black and white image. From the difference image, rectangular contours or shapes are located around the text provided on the difference image. The difference image may also include other text and group(s) of text that may be included in advertisement banners and background regions, for example, after the expandable graphical component is in the expanded state. If there are multiple rectangular contours provided in the difference image, then the rectangular contour closest in distance to the expandable graphical component is the likely rectangular contour for selection.

As illustrated in FIG. 5C, text and group(s) of text encircled with a rectangular contour 525 are illustrated in the difference image 532. It may be, however, difficult to determine which one of the group(s) of text is the group of text that belongs to the expanded region 516 of the expandable graphical component 550. According to an embodiment of the present disclosure, the groups of text are first vertically arranged. According to a further embodiment of the present disclosure, one or more margins are provided for each of the vertically arranged groups of text. For example, a left-hand side margin may be provided for each of the vertically arranged groups of text. According to alternative embodiments of the present disclosure, one or more right-hand side, top side and bottom side margins may be provided for each of the vertically arranged groups of text. According to a further embodiment of the present disclosure, a confidence score may be provided for each of the groups of text. For example, the confidence score may be based on a distance from the aligned group of text to the input box 504 of the expandable graphical component, the height of the text in each of the aligned groups of text, and/or the height of the text in each of the aligned groups of text as compared with the height of the input box 504 of the expandable graphical component. However, since the location of the input box 504 and the toggle list box button 508 of the expandable graphical component 550 is known, then the expanded region 516 of the expandable graphical component 550 can be determined. According to embodiments of the present disclosure, a confidence score may be assigned to each of the text and group(s) of text and used to indicate a degree of confidence for each text and group of text closest to the expandable graphical component 550. Accordingly, a selection of one of the group(s) of text can be made based on the confidence score.

According to embodiments of the present disclosure, the aligned group(s) of text may be filtered to remove any background aligned group(s) of text blocks and the only text block remaining would be the text block that belongs in the expanded region 516. As stated above, the group(s) of text may be arranged into vertically arranged lists. The group(s) of text may be aligned in the vertical direction, and it may be determined whether the text in the group of text has similar text height. The text height should be smaller than the height of the text provided in the expanded region of an expandable graphical component. The group(s) of text can be further aligned to find margins within the expanded region. For example, when text is read from left-to-right, a margin should be on the left-hand side of the expanded region. Alternatively, when text is read from right-to-left, a margin should be on the right-hand side of the expanded region. According to another embodiment of the present disclosure, when text is read from top-to-bottom and right-to-left, a margin should be at the top and another margin should also be on the right-hand side of the expanded region.

Figure 6:
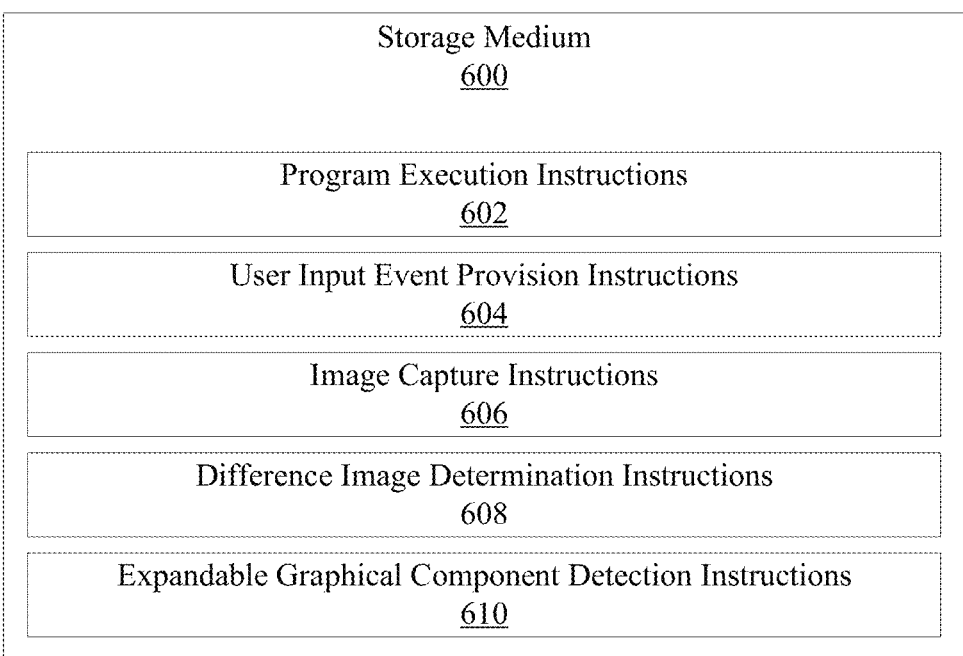
FIG. 6 is a block diagram of a storage medium storing machine-readable instructions according to embodiments of the present disclosure.

FIG. 6 is a block diagram of a non-transitory machine-readable or computer-readable storage medium 600 storing machine-readable instructions that upon execution cause a system to perform various tasks. The machine-readable instructions include program execution instructions 402 to execute an application (e.g., 304 in FIG. 3) that generates a GUI screen.

The machine-readable instructions include user input event provision instructions 604 to provide a user input event (e.g., a mouse event, a keyboard event, a touch event, etc.) to the application during execution (where the user input event can be detected by the event detector 312 of FIG. 3, for example). The machine-readable instructions further include image capture instructions 606 (e.g., part of the image recorder 318 of FIG. 3) to capture images of the GUI screen before and after the user input event.

The machine-readable instructions include difference image determination instructions 608 to determine, based on the captured images, whether a region of the GUI screen changed in response to the user input event. The machine-readable instructions further include expandable graphical component detection instructions 610 to identify an expandable region of an expandable graphical component of a GUI of the application.

Figure 7:
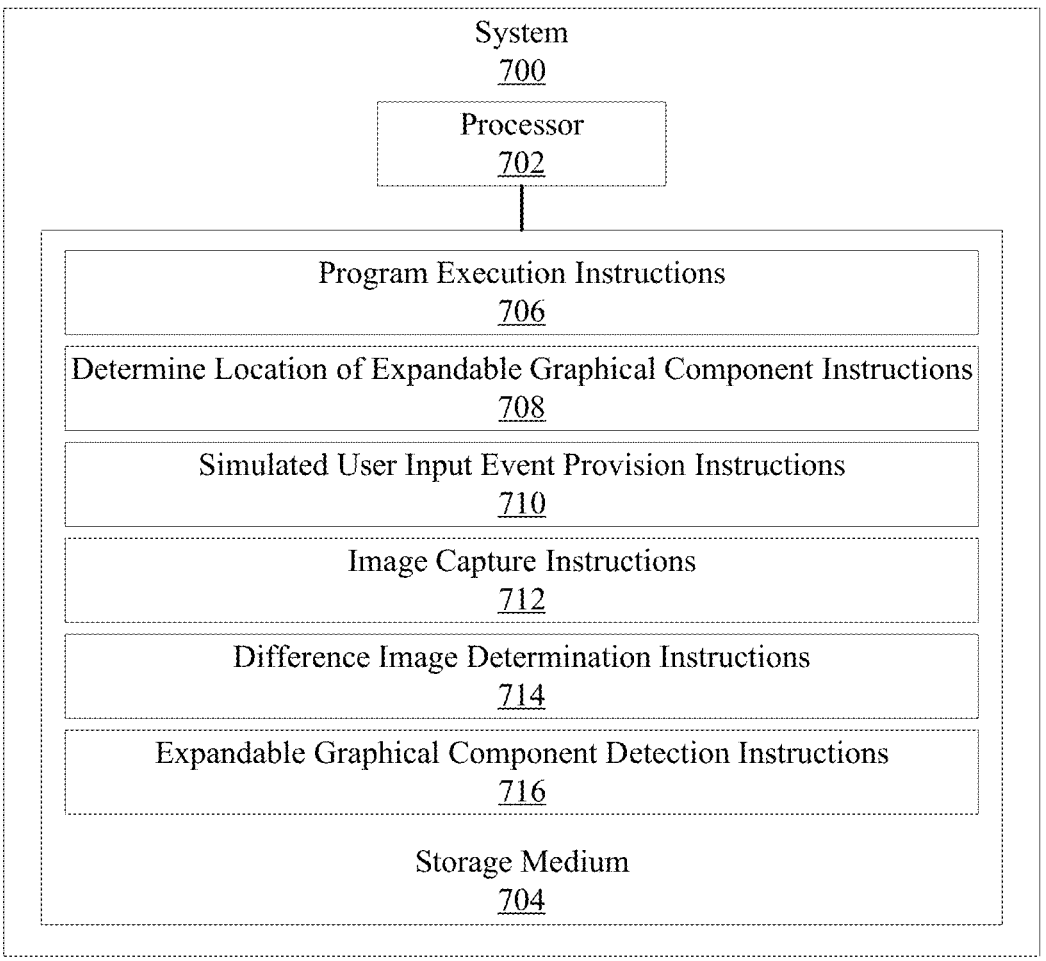
FIG. 7 is a block diagram of a system according to embodiments of the present disclosure.

FIG. 7 is a block diagram of a system 700 according to some examples. The system 700 includes a hardware processor 702 (or multiple hardware processors). A hardware processor can include a microprocessor, a core of a multi-core microprocessor, a microcontroller, a programmable integrated circuit, a programmable gate array, a digital signal processor, or another hardware processing circuit.

The system 700 further includes a storage medium 704 storing machine-readable instructions executable on the hardware processor 702 to perform various tasks. Machine-readable instructions executable on a hardware processor can refer to the instructions executable on a single hardware processor or the instructions executable on multiple hardware processors.

The machine-readable instructions stored in the storage medium 704 include program execution instructions 706 to execute an application that generates a GUI screen. The machine-readable instructions further include determine location of expandable graphical component instructions 708 to find the location of the expandable graphical component. The machine-readable instructions further include simulated user input event provision instructions 710 to provide a simulated user input event to the expandable graphical component during execution of the application.

The machine-readable instructions include image capture instructions 712 to capture images of the GUI screen before and after the user input event. The machine-readable instructions include difference image determination instructions 714 to determine, based on the captured images, whether a region of the GUI screen changed in response to the user input event. The machine-readable instructions include expandable graphical component detection instructions 716 to determine the expanded region of the expandable graphical component of the application.

FIG. 8 is a flowchart illustrating an example method 800 for automatically testing of an application according to embodiments of the present disclosure. While a general order of the steps of method 800 is shown in FIG. 8, method 800 can include more or fewer steps or can arrange the order of the step differently than those shown in FIG. 8. Further, two or more steps may be combined in one step. Generally, the method 800 starts with a START operation at step 804 and ends with an END operation at step 836. The method 800 can be executed as a set of computer-executable instructions executed by a computer system (e.g., CPU(s) 208, etc.) and encoded or stored on a computer readable medium. Hereinafter, the method 800 shall be explained with reference to the systems, components, modules, applications, software, data structures, user interfaces, etc. described in conjunction with FIGS. 1-7.

Although not illustrated, the method 800 may start with initiating execution of the application under test 304. In some examples, the initiation of the application under test 304 can be performed in a stateless way, such as by using a script. Starting the application under test 304 in a stateless way refers to the application under test 304 being initiated as if the application under test 304 was started for the first time. According to one embodiment of the present disclosure, prior to any input being provided with respect to the GUI 308, of the application under test 304 that has been initiated, the image recorder 318 captures multiple images of the GUI 308 of the application under test 304 during a time interval in which no user input events occurred.

Method 800 begins with START operation at step 804 and proceeds to step 808, where the processor 308 receives an image from the image recorder 318 taken before the expandable graphical component is in the expanded state. After receiving from the image recorder 318 taken before the expandable graphical component is in the expanded state at step 808, method 800 proceeds to step 812, where the processor 208 receives an image from the image recorder 318 taken after the expandable graphical component is in the expanded state. After receiving an image from the image recorder 318 taken after the expandable graphical component is in the expanded state at step 812, method 800 proceeds to step 816, where the processor 208 determines a difference image. After determining the difference image at step 816, method 800 proceeds to step 820, where the processor 208 finds newly appearing group(s) of text on the difference image by performing OCR. After finding newly appearing group(s) of text on the difference image by performing OCR at step 820, method 800 proceeds to step 824, where the processor 208 aligns the group(s) of text into vertically arranged list. After aligning the group(s) of text into vertically arranged list at step 824, method 800 proceeds to step 828, where the processor 208 receives a selection of one of the groups of text based on a determined probability for each of the groups of text being closest to the collapsed expandable graphical component. After receiving a selection of one of the groups of text based on a determined probability for each of the groups of text being closest to the collapsed expandable graphical component at step 828, method 800 proceeds to step 832 where the processor formats the selected group of text within the expanded region of the expandable graphical component to determine the margins within the expandable graphical component. According to one embodiment of the present disclosure, formatting the selected group of text within the expanded region of the expandable graphical component means finding margins between the selected group of text and the expanded region. For example, a top margin between the bottom of the expanded region of the expandable graphical component and the top of the selected group of text can be determined. After formatting the selected group of text within the expanded region of the expandable graphical component at step 832, method 800 ends with the END operation at step 836.

Figure 9:
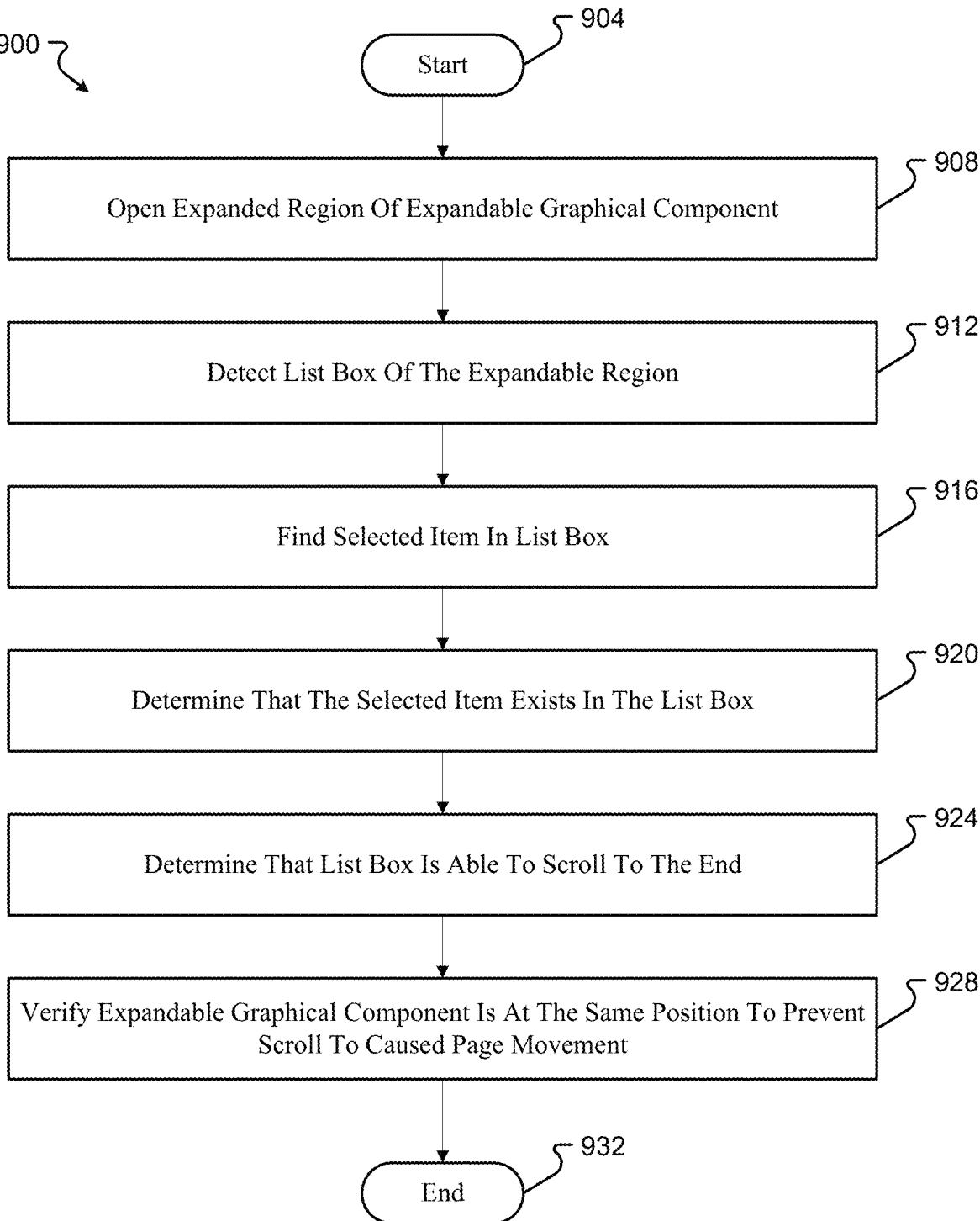
FIG. 9 is a flowchart illustrating an example method for automatically testing of an application according to embodiments of the present disclosure.

FIG. 9 is a flowchart illustrating an example method 900 for automatically testing of an application according to embodiments of the present disclosure. While a general order of the steps of method 900 is shown in FIG. 9, method 900 can include more or fewer steps or can arrange the order of the step differently than those shown in FIG. 9. Further, two or more steps may be combined in one step. Generally, the method 900 starts with a START operation at step 904 and ends with an END operation at step 932. The method 900 can be executed as a set of computer-executable instructions executed by a computer system (e.g., CPU(s) 208, etc.) and encoded or stored on a computer readable medium. Hereinafter, the method 900 shall be explained with reference to the systems, components, modules, applications, software, data structures, user interfaces, etc. described in conjunction with FIGS. 1-7.

Method 900 begins with the START operation at step 904 and proceeds to step 908, where the processor 208 receives an input (e.g., a user clicking the expandable graphical component) to open the expanded region. After receiving an input to open the expanded region at step 908, method 900 proceeds to step 912 where the processor 208 detects the list box of the expanded region. After detecting the list box of the expanded region at step 912, method 900 proceeds to step 916 where the processor 208 receives an input of a selected item from the list box of the expanded region. After receiving an input of a selected item from the list box of the expanded region at step 916, method 900 proceeds to step 920 where the processor 208 determines that the selected item exists in the list box. After determining the selected item exists in the list box at step 920, method 900 proceeds to step 924 where the processor 208 determines that the list box is able to scroll to the end. After determining that the list box is able to scroll to the end at step 924, method 900 proceeds to step 928 where the processor 208 verifies the expandable graphical component is at the same position to prevent scroll to cause page movement. After verifying the expandable graphical component is at the same position to prevent scroll to cause page movement at step 928, method 900 ends with the END operation at step 932.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device (s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub-combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for automatically testing of an application, the method comprising:

executing, by a processor of a testing system, one or more test scripts on an Application Under Test (AUT), the AUT including a graphical user interface (GUI) including a plurality of graphical elements and the one or more test scripts causing the processor to perform one or more functional tests on the AUT through the plurality of graphical elements of the GUI;

capturing, by an imaging device of the testing system, a first image of the GUI at a first time;

after the first time, providing, by the testing system, an input event to the GUI to change a configuration of at least one of the plurality of graphical elements to include an expanded region;

capturing, by the imaging device of the testing system, a second image of the GUI at a second time after the input event;

generating, by the processor of testing system, a difference image by computing a difference between the first image and the second image based on an image of the GUI with an expandable graphical component in a collapsed state and an image of the GUI with the expandable graphical component in an expanded state;

filtering, by the processor of the testing system, the difference image to detect an expandable graphical region of the expandable graphical component from text provided on the difference image;

detecting, by the processor of the testing system, text blocks in the second image by applying optical character recognition (OCR) to candidate regions of the second image and labeling detected regions as background text blocks or candidate expanded region text blocks;

determining, by the processor of the testing system, whether the difference image includes one or more background text blocks and at least one expanded region text block; and selecting, by the processor of the testing system, a labeled text block closest to a position of the at least one of the plurality of graphical elements as the expanded region text block.

2. The method of claim 1, wherein the plurality of graphical elements includes a text input box, a list box and a toggle button.

3. The method of claim 2, further comprising filtering the one or more background text blocks based on a height of text within the one or more background text blocks exceeding a height of the text input box.

4. The method of claim 1, further comprising determining, by the processor of the testing system, a confidence score indicating a degree of confidence for each of the expanded region text block and the one or more background text blocks.

5. The method of claim 1, further comprising, upon determining that difference image includes the one or more background text blocks and the expanded region text block, causing one of the one or more test scripts of the AUT to execute an operation associated with one of the plurality of graphical elements of the GUI.

6. The method of claim 1, further comprising aligning the one or more background text blocks and the expanded region text block in vertically arranged lists.

7. The method of claim 6, further comprising creating a margin for the vertically arranged lists.

8. A system comprising:

a processor; and a memory coupled with and readable by the processor and storing therein a set of instructions which, when executed by the processor, causes the processor to:

execute one or more test scripts on an Application Under Test (AUT), the AUT including a graphical user interface (GUI) including a plurality of graphical elements and the one or more test scripts causing the processor to perform one or more functional tests on the AUT through the plurality of graphical elements of the GUI;

capture a first image of the GUI at a first time;

after the first time, provide the GUI with an input event to change a configuration of at least one of the plurality of graphical elements to include an expanded region;

capture a second image of the GUI at a second time after the input event;

generate a difference image by computing a difference between the first image and the second image based on an image of the GUI with an expandable graphical component in a collapsed state and an image of the GUI with the expandable graphical component in an expanded state;

filter the difference image to detect an expandable graphical region of the expandable graphical component from text provided on the difference image;

detect text blocks in the second image by applying optical character recognition (OCR) to candidate regions of the second image and label detected regions as background text blocks or candidate expanded region text blocks;

determine whether the difference image includes one or more background text blocks and an expanded region text block; and select a labeled text block closest to a position of the at least one of the plurality of graphical elements as the expanded region text block.

9. The system of claim 8, wherein the plurality of graphical elements includes a text input box, a list box and a toggle button.

10. The system of claim 9, wherein the instructions, when executed by the processor, further cause the processor to filter the one or more background text blocks based on a height of text within the one or more background text blocks exceeding a height of the text input box.

11. The system of claim 8, wherein the instructions, when executed by the processor, further cause the processor to determine a confidence score indicating a degree of confidence for each of the expanded region text block and the one or more background text blocks.

12. The system of claim 8, wherein the instructions, when executed by the processor, further cause the processor, upon determining that the difference image includes the one or more background text blocks and the expanded region text block, to cause one of the one or more test scripts of the AUT to execute and operation associated with the one of the plurality of graphical elements of the GUI.

13. The system of claim 8, wherein the instructions, when executed by the processor, further cause the processor to align the one or more background text blocks and the expanded region text block in vertically arranged lists.

14. The system of claim 13, wherein the instructions, when executed by the processor, further cause the processor to create a margin for the vertically arranged lists.

15. A non-transitory, computer-readable medium comprising a set of instructions stored therein which when executed by a processor, causes the processor to:

execute one or more test scripts on an Application Under Test (AUT), the AUT including a graphical user interface (GUI) including a plurality of graphical elements and the one or more test scripts causing the processor to perform one or more functional tests on the AUT through the plurality of graphical elements of the GUI;

capture a first image of the GUI at a first time;

after the first time, provide the GUI with an input event to change a configuration of at least one of the plurality of graphical elements to include an expanded region;

capture a second image of the GUI at a second time after the input event;

generate a difference image by computing a difference between the first image and the second image based on an image of the GUI with an expandable graphical component in a collapsed state and an image of the GUI with the expandable graphical component in an expanded state;

filter the difference image to detect an expandable graphical region of the expandable graphical component from text provided on the difference image;

detect text blocks in the second image by applying optical character recognition (OCR) to candidate regions of the second image and label detected regions as background text blocks or candidate expanded region text blocks;

determine whether the difference image includes one or more background text blocks and the candidate expanded region text block; and select a labeled text block closest to a position of the at least one of the plurality of graphical elements as the candidate expanded region text block.

16. The non-transitory, computer-readable medium of claim 15, wherein the plurality of graphical elements includes a text input box, a list box and a toggle button.

17. The non-transitory computer-readable medium of claim 16, wherein the instructions, when executed by the processor, further cause the processor to filter the one or more background text blocks based on a height of text within the one or more background text blocks exceeding a height of the text input box.

18. The non-transitory computer-readable medium of claim 15, wherein the instructions, when executed by the processor, further cause the processor to determine a confidence score indicating a degree of confidence for each of the candidate expanded region text block and the one or more background text blocks.

19. The non-transitory computer-readable medium of claim 15, wherein the instructions, when executed by the processor, further cause the processor to align the one or more background text blocks and the candidate expanded region text block in vertically arranged lists.

20. The non-transitory, computer-readable medium of claim 19, wherein the instructions, when executed by the processor, further cause the processor to create a margin for the vertically arranged lists.

\*　\*　\*　\*　\*